United States Patent
Lei et al.

(10) Patent No.: US 11,979,045 B2
(45) Date of Patent: *May 7, 2024

(54) SMART CONNECTION DEVICE, JUMP STARTER, AND BATTERY CLAMP

(71) Applicant: SHENZHEN CARKU TECHNOLOGY CO., LIMITED, Guangdong (CN)

(72) Inventors: Yun Lei, Guangdong (CN); Zhifeng Zhang, Guangdong (CN); Ming Cheng, Guangdong (CN); Jianping Lin, Guangdong (CN); Mingxing Ouyang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,970

(22) Filed: Jan. 31, 2022

(65) Prior Publication Data
US 2022/0158463 A1     May 19, 2022

Related U.S. Application Data

(63) Continuation of application No. 17/167,408, filed on Feb. 4, 2021, now Pat. No. 11,277,014.

(30) Foreign Application Priority Data

Nov. 19, 2020 (CN) .......................... 202011318257.3
Nov. 19, 2020 (CN) .......................... 202022697397.8

(51) Int. Cl.
*H02J 7/00*      (2006.01)
*H01R 11/24*    (2006.01)
*H02J 1/10*      (2006.01)

(52) U.S. Cl.
CPC ............ *H02J 7/0034* (2013.01); *H01R 11/24* (2013.01); *H02J 1/122* (2020.01)

(58) Field of Classification Search
CPC .......... H02J 7/0034; H02J 1/122; H02J 7/342; H02J 7/0031; H01R 11/24; B60R 16/033; B60R 16/04; G08B 21/185; H02H 7/18
(Continued)

(56) References Cited

U.S. PATENT DOCUMENTS

| 5,517,379 A | 5/1996 | Williams et al. | |
| 5,621,625 A * | 4/1997 | Bang .................. | H02M 1/32 |
| | | | 363/56.09 |

(Continued)

FOREIGN PATENT DOCUMENTS

| CN | 210273514 U | 4/2020 |
| JP | S55-101765 A | 8/1980 |

(Continued)

OTHER PUBLICATIONS

English Translation of WO2020177467A1, Liao Yuefei et al., "Smart Battery Wire Clip, Integrated Starting Power Supply Device, and Ignition Method" (Year: 2020).*

(Continued)

*Primary Examiner* — M Baye Diao
(74) *Attorney, Agent, or Firm* — HAUPTMAN HAM, LLP

(57) ABSTRACT

The present disclosure provides a smart connection device, a jump starter and a battery clamp. The smart connection device includes a power connection terminal coupled to an energy storage module, a load connection terminal coupled to an external load, a switch element, a power supply loop, and a reverse connection detection module. The reverse connection detection module outputs a first control signal to the power supply loop, when the external load is reversely (Continued)

coupled to the load connection terminal. The power supply loop is in a disconnection state and supplies no power to the switch element when it receives the first control signal. The switch element is in an off state when it receives no power supply, to make the power connection terminal and the load connection terminal be in a disconnection state, thereby preventing the energy storage module from providing a discharge output to the external load.

20 Claims, 7 Drawing Sheets

(58) Field of Classification Search
USPC .......................................................... 320/105
See application file for complete search history.

(56) References Cited

U.S. PATENT DOCUMENTS

| | | | |
|---|---|---|---|
| 5,637,978 A | 6/1997 | Kellett et al. | |
| 5,969,502 A * | 10/1999 | Beard | H01M 10/44 320/116 |
| 6,344,733 B1 * | 2/2002 | Crass | H02J 7/007182 320/143 |
| 6,803,743 B2 | 10/2004 | George et al. | |
| 6,822,425 B2 | 11/2004 | Krieger et al. | |
| 6,891,350 B2 * | 5/2005 | George | H02J 7/0034 320/105 |
| 8,958,956 B1 * | 2/2015 | Felps | H02J 7/00306 254/362 |
| 9,162,639 B2 * | 10/2015 | Kanzaki | B60R 16/033 |
| 9,718,419 B2 * | 8/2017 | Proebstle | F02N 11/087 |
| 9,871,389 B2 | 1/2018 | Yamaji et al. | |
| 9,912,183 B2 * | 3/2018 | Kokot, Jr. | H02J 7/342 |
| 2004/0130298 A1 * | 7/2004 | Krieger | H02J 7/0034 320/165 |
| 2005/0035741 A1 | 2/2005 | Elder et al. | |
| 2009/0159357 A1 * | 6/2009 | Diederich | B62K 23/02 180/335 |
| 2011/0279089 A1 * | 11/2011 | Yeo | B60R 16/03 320/134 |
| 2013/0154543 A1 * | 6/2013 | Richardson | B60L 53/16 320/109 |
| 2013/0181630 A1 * | 7/2013 | Taipale | H05B 45/10 315/210 |
| 2014/0257632 A1 | 9/2014 | Kanzaki et al. | |
| 2014/0300274 A1 * | 10/2014 | Acatrinei | H05B 45/3578 315/122 |
| 2016/0072323 A1 | 3/2016 | Miller et al. | |
| 2016/0241027 A1 * | 8/2016 | Lei | H02J 7/0034 |
| 2018/0248355 A1 * | 8/2018 | Iwasaki | H03K 17/0822 |
| 2020/0370527 A1 * | 11/2020 | Sturtevent | F02N 11/0803 |
| 2021/0208617 A1 * | 7/2021 | Strydom | G05F 1/565 |
| 2022/0069574 A1 * | 3/2022 | Liao | H02J 7/0034 |

FOREIGN PATENT DOCUMENTS

| | | |
|---|---|---|
| JP | H03022831 A | 1/1991 |
| JP | 2004229331 A | 8/2004 |
| JP | 2014082863 A | 5/2014 |
| WO | 2020177467 A1 | 9/2020 |

OTHER PUBLICATIONS

The Extended European Search Report issued in corresponding EP Application No. EP21155325.0, dated Jul. 1, 2021.
The First Office Action issued in corresponding U.S. Appl. No. 17/167,408, dated Apr. 5, 2021.
The Final Office Action issued in corresponding U.S. Appl. No. 17/167,408, dated Jul. 14, 2021.
The First Office Action issued in corresponding JP Application No. JP2021-180290, dated Sep. 29, 2022.
The Second Office Action issued in corresponding JP Application No. JP2021-180290, dated Feb. 17, 2023.
The First Office Action issued in corresponding CA Application No. 3,136,099, dated Jan. 9, 2023.

* cited by examiner

SMART CONNECTION DEVICE, JUMP STARTER, AND BATTERY CLAMP

CROSS-REFERENCE TO RELATED DISCLOSURE(S)

The present disclosure is a continuation of U.S. application Ser. No. 17/167,408, filed on Feb. 4, 2021, which claims priority to and the benefit of Chinese Patent Application No. 202011318257.3 and 202022697397.8, filed on Nov. 19, 2020, the entire disclosures of which are hereby incorporated by reference in their entireties.

TECHNICAL FIELD

The present disclosure relates to the field of electronic technology, and more particularly to a smart connection device, a jump starter, and a battery clamp.

BACKGROUND

A majority of emergency jump starter products currently available on the market can achieve an emergency start-up output function to ignite an engine of a vehicle. However, a start-up circuit of most similar products is not capable of automatically recognizing polarities of connection electrodes. During an operation of electrically connecting to an external load such as a battery of the vehicle, some users are unable to correctly distinguish the polarities of the electrical connection electrodes of the external load and those of an output port of a jump starter. When the connection electrodes of the external load and the connection electrodes of the output port of the jump starter are incorrectly connected together, for example, the electrodes of the two are reversely connected, related circuit may be short circuited, which may cause damage to external load or the battery of the jump starter, and may even cause fire which may bring safety incidents, such as property damage, personnel injury, etc.

Some jump starters currently available on the market are provided with a polarity identification circuit or a polarity reverse connection protection circuit. However, most of them use a photoelectric isolation device as a polarity detection device. When the electrodes are reversely connected, the photoelectric isolation device outputs a reverse connection signal, and then a micro-controller unit (MCU) cuts off a discharge output loop of the jump starter according to the reverse connection signal. At the same time, the MCU also controls a corresponding state indication circuit to raise an alarm.

However, the photoelectric isolation device and the MCU have application defects such as high cost, vulnerability to fading of service life, a long time to response, and vulnerability to failure caused by external interference. When the user reversely connects the electrodes of the external load to those of the output port of the jump starter, once the photoelectric isolation device fails or it is abnormal in transmitting the reverse connection signal, the MCU is generally unable to respond to the reverse connection signal accurately in time due to misjudgment, and thus unable to disconnect the discharge output of the jump starter in time. In this way, the jump starter or the external load is likely to be damaged.

SUMMARY

To solve the above-mentioned application defects of existing polarity detection circuits for connection electrodes and power output control system, the present disclosure provides a smart connection device, a jump starter, and a battery clamp, which can quickly detect and respond to the reverse connection state of the external load, and control a discharge output of the battery assembly to the external load in time, thereby improving detection speed and effectiveness of related protection functions, and improving safety and reliability of a power output control system.

According to a first aspect of the implementations of the present disclosure, a smart connection device is provided. The smart connection device includes a power connection terminal, a load connection terminal, a switch element, a power supply loop of the switch element, and a reverse connection detection module. The power connection terminal is configured to electrically couple with an energy storage module. The load connection terminal is configured to electrically couple with an external load. The switch element is electrically coupled between the power connection terminal and the load connection terminal. The reverse connection detection module is electrically coupled to the load connection terminal and the power supply loop, respectively. The reverse connection detection module is configured to output a first control signal to the power supply loop when it detects that the external load is reversely coupled to the load connection terminal. The power supply loop is in a disconnection state and supplies no power to the switch element when the power supply loop receives the first control signal. The switch element is in an off state when the switch element receives no power supply, so as to make the power connection terminal and the load connection terminal be in a disconnection state, thereby preventing the energy storage module from providing a discharge output to the external load.

According to a second aspect of the implementations of the present disclosure, a jump starter is provided. The jump starter comprises an energy storage module and a smart connection device. The smart connection device includes a power connection terminal, a load connection terminal, a switch element, a power supply loop of the switch element, and a reverse connection detection module. The power connection terminal is electrically coupled to the energy storage module. The load connection terminal is configured to electrically couple with an external load. The switch element is electrically coupled between the power connection terminal and the load connection terminal. The reverse connection detection module is electrically coupled to the load connection terminal and the power supply loop, respectively. The reverse connection detection module is configured to output a first control signal to the power supply loop when it detects that the external load is reversely coupled to the load connection terminal. The power supply loop is in a disconnection state and supplies no power to the switch element when the power supply loop receives the first control signal. The switch element is in an off state when the switch element receives no power supply, so as to make the power connection terminal and the load connection terminal be in a disconnection state, thereby preventing the energy storage module from providing a discharge output to the external load.

According to a third aspect of the implementations of the disclosure, a battery clamp is provided. The battery clamp includes a housing, a power input interface, a connection element, and a smart connection device. The power input interface is provided on the housing. The power input interface is configured to electrically couple with an external power supply device having an energy storage module. The smart connection device includes a power connection terminal, a load connection terminal, a switch element, a power supply loop of the switch element, and a reverse connection detection module. The power connection terminal is electrically coupled to the power input interface, and electrically coupled to the energy storage module of the external power supply device through the power input interface. The switch element is electrically coupled between the power connection terminal and the load connection terminal. The reverse connection detection module is electrically coupled to the load connection terminal and the power supply loop respectively. One end of the connection element is electrically coupled to the load connection terminal of the smart connection device, and the other end of the connection element is configured to electrically couple with an external load. The reverse connection detection module is configured to output a first control signal to the power supply loop when it detects that the external load is reversely coupled to the load connection terminal. The power supply loop is in a disconnection state and supplies no power to the switch element when the power supply loop receives the first control signal. The switch element is in an off state when the switch element receives no power supply, so as to make the power connection terminal and the load connection terminal be in a disconnection state, thereby preventing the energy storage module from providing a discharge output to the external load.

BRIEF DESCRIPTION OF THE DRAWINGS

In order to illustrate the technical solutions of the implementations of the present disclosure more clearly, the accompanying drawings required for describing the implementations of the present disclosure will be briefly introduced below. It is obvious that the accompanying drawings in the following description only illustrate some implementations of the present disclosure. Those skilled in the art may also obtain other drawings based on these accompanying drawings without paying any creative efforts.

DESCRIPTION OF SYMBOLS OF MAIN COMPONENTS

Figure 1:
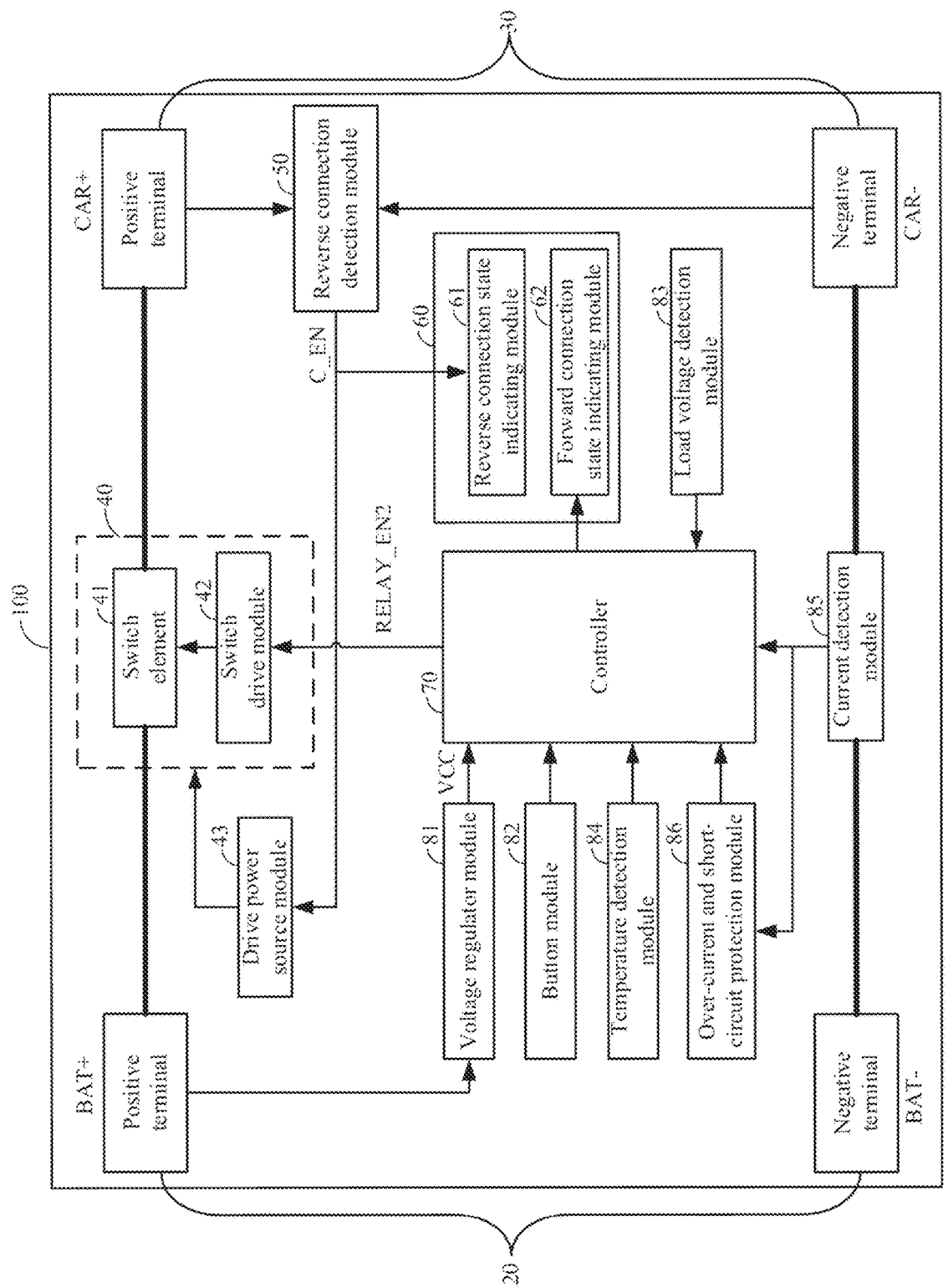
FIG. 1 is a schematic diagram of functional modules of a smart connection device according to an implementation of the present disclosure.

Smart connection device 100; current output loop 11; power connection terminal 20; positive terminal BAT+; negative terminal BAT−; load connection terminal 30; positive terminal CAR+; negative terminal CAR−; first ground terminal PGND; switch circuit 40; switch element 41; switch drive module 42; drive power source module 43; drive power input terminal 431; control switch Q8; diodes D1 and D3; resistors R4, R10, R11, R16, R21, R22, R23, R27, and R26; reverse connection detection module 50; first detection terminal 51; second detection terminal 52; drive voltage input terminal 53; control signal output terminal 54; first transistor Q3; second transistor Q6; second ground terminal GND; load connection state indicating module 60; reverse connection state indicating module 61; switch unit Q1; display unit 611; light emitting diode LED2; alarm unit 612; speaker LS1; zener diode D9; capacitor C6; forward connection state indicating module 62; controller 70; microcontroller U2; voltage regulator module 81; button module 82; load voltage detection module 83; temperature detection module 84; current detection module 85; over-current and short-circuit protection module 86; jump starters 200 and 200'; housings 201, 201', and 301; battery assembly 202; connection socket 203; charging interface 204; battery clamp 300; power input interface 302; connection elements 400, 205, and 303; first wire clamp 401; second wire clamp 402; cable 403; connection plug 404; external power supply device 500; connection socket 501.

The present disclosure will be further illustrated by following specific implementations with reference to the above-mentioned accompanying drawings.

DETAILED DESCRIPTION

Technical solutions in the implementations of the present disclosure will be clearly and completely described below with reference to the accompanying drawings in the implementations of the present disclosure. It is understood that the accompanying drawings are only for illustrative purposes, and are only schematic drawings, which cannot be understood as restrictions on the present disclosure. Obviously, the described implementations are only part of the implementations of the present disclosure, not all the implementations. Based on the implementations in the present disclosure, all other implementations obtained by those skilled in the art without paying any creative efforts belong to the scope of protection of the present disclosure.

Unless otherwise defined, all technical and scientific terms used in the present disclosure have the same meanings as those commonly understood by those skilled in the art. The terms used in the specification of the present disclosure are only for the purpose of describing the specific implementation, and are not intended to limit the present disclosure.

The present disclosure provides a smart connection device. In the smart connection device, a transmission of drive power that is supplied by a drive power source module to a switch circuit is directly controlled by control signals output from a reverse connection detection module, an operation state of the switch circuit is thus controlled, thereby being able to quickly respond to a control signal that corresponds to a reverse connection state of an external load, and timely control a discharge output of the battery assembly to the external load. The smart connection device is applicable in an emergency jump starter or a battery clamp.

FIG. 1 is a schematic diagram of functional modules of a smart connection device provided by the present disclosure. As illustrated in FIG. 1, a smart connection device 100 includes a power connection terminal 20, a load connection terminal 30, and a switch circuit 40. The power connection terminal 20 is configured to electrically couple with a battery assembly (not illustrated), the load connection terminal 30 is configured to electrically couple with an external load (not illustrated), and the switch circuit 40 is electrically coupled between the power connection terminal 20 and the load connection terminal 30.

Figure 2:
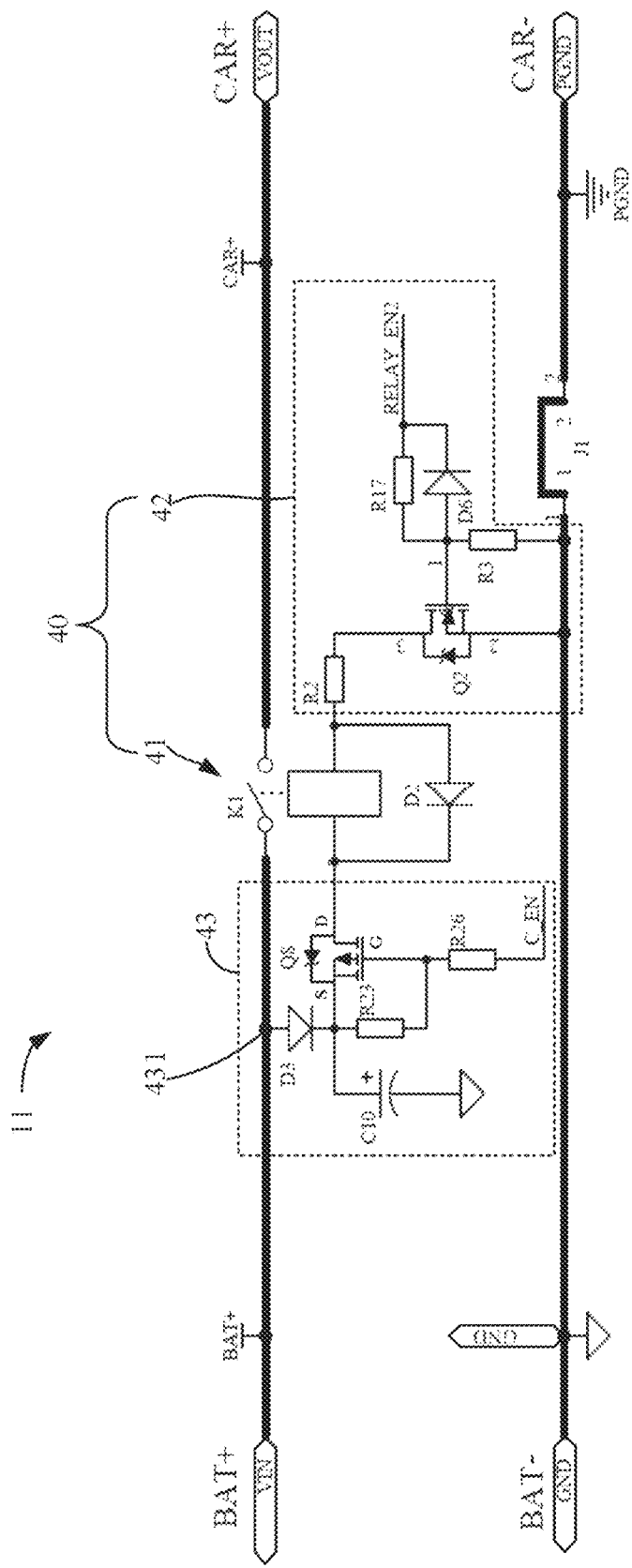
FIG. 2 is a circuit structure diagram of a current output loop of the smart connection device illustrated in FIG. 1.

Referring to FIG. 1 and FIG. 2, the power connection terminal 20, the load connection terminal 30, and the switch circuit 40 cooperate to form a current output loop 11 through which the battery assembly is capable of charging the external load. The switch circuit 40 is configured to turn on or cut off the current output loop 11. In this way, the battery assembly can charge the external load through the smart connection device 100.

In this implementation, the power connection terminal 20 includes a positive terminal BAT+ and a negative terminal BAT−. The positive terminal BAT+ and the negative terminal BAT− of the power connection terminal 20 are configured to electrically couple with a positive electrode and a negative electrode of the battery assembly in a one-to-one correspondence. The battery assembly is coupled to the smart connection device 100 through the power connection terminal 20, so as to provide working voltage for the smart connection device 100 and provide, through the switch circuit 40, electrical power for the external load. It can be understood that when the smart connection device 100 is applied in an emergency jump starter, the battery assembly may be a built-in battery module of the emergency jump starter. When the smart connection device 100 is applied in a battery clamp, the battery assembly may be a battery module of an external power supply device such as an external emergency jump starter or another energy storage power supply devices.

The load connection terminal 30 includes a positive terminal CAR+ and a negative terminal CAR−. The positive terminal CAR+ and the negative terminal CAR− of the load connection terminal 30 are configured to electrically couple with a positive electrode and a negative electrode of the external load in a one-to-one correspondence. The negative terminal CAR− is further electrically coupled to a first ground terminal PGND. The external load may be a battery or engine of a vehicle. It can be understood that the battery of the vehicle includes but is not limited to a lead-acid battery, a lithium battery, and a super capacitor. Taking an example in which the battery assembly is a built-in battery module of an external emergency jump starter, and the external load is a battery or engine of a vehicle, when the external emergency jump starter is correctly coupled to the smart connection device 100 through the power connection terminal 20, and the external load is correctly coupled to the load connection terminal 30, the external emergency jump starter is able to provide a discharge output through the current output loop 11 formed by the power connection terminal 20, the switch circuit 40, and the load connection terminal 30, so as to provide an emergency jump starter to the battery or engine of the vehicle. In other words, the external emergency jump starter charge the battery or engine of the vehicle. In this way, the vehicle can still be started up even when its battery or engine is in a low state-of-charge (SOC). It needs to be noted that, in the present disclosure, "correctly coupled/connected" can also be understood as "forward connected/connected". Hereinafter, "forward connection" or the like between the external load and the power connection terminal 21 means "correct connection".

Referring to FIG. 1 again, the smart connection device 100 further includes a voltage regulator module 81 electrically coupled to the power connection terminal 20. The voltage regulator module 81 is configured to receive, through the power connection terminal 20, an input voltage provided by the battery assembly, and perform a voltage conversion on the input voltage to output a stable voltage VCC, such as 5V direct-current voltage, so as to provide stable working voltage for various functional modules of the smart connection device 100. For example, when the external emergency jump starter is correctly coupled to the smart connection device 100 through the power connection terminal 20, the voltage regulator module 81 can obtain the input voltage and work normally, and output the stable voltage VCC to supply power the functional modules of the smart connection device 100. In this way, the functional modules are energized and work normally. The voltage regulator module 81 may be a DC-DC converter or a linear regulator, such as a low-dropout linear regulator (LDO).

In this implementation, the smart connection device 100 further includes a drive power source module 43 electrically coupled to the switch circuit 40. The drive power source module 43 is configured to supply drive power to the switch circuit 40 to keep the switch circuit 40 in an energized and valid state. In this implementation, an on/off-state of the switch circuit 40 is not controllable unless the switch circuit 40 is in the energized and valid state. When the switch circuit 40 is in a de-energized state, the switch circuit 40 is automatically turned off and becomes invalid, with its on/off-state being not controllable. It needs to be noted that the term "invalid" for the switch circuit 40 herein means that the switch circuit 40 is prevented from responding to related signals such as a drive signal. In this case, the switch circuit 40 is in an invalid state in which the switch circuit 40 is not controlled by the related signals.

In an implementation, the drive power source module 43 is electrically coupled to the power connection terminal 20, and the drive power of the switch circuit 40 is provided by the battery assembly electrically coupled to the power connection terminal 20. Optionally, in another implementation, the drive power source module 43 may also be electrically coupled to the voltage regulator module 81, and the drive power of the switch circuit 40 is provided by the stable voltage VCC that is output from the voltage regulator module 81.

The smart connection device 100 further includes a controller 70 electrically coupled to the switch circuit 40. The controller 70 is configured to output a drive signal RELAY_EN2 to the switch circuit 40 to turn on the switch circuit 40 that is in the energized and valid state. Specifically, the switch circuit 40 enters an on-state upon receiving the drive signal RELAY_EN2 that is output by the controller 70. In this way, the battery assembly can be electrically coupled to the external load, and provide a discharge output to the external load.

In this implementation, the smart connection device 100 further includes a button module 82 electrically coupled to the controller 70. The button module 82 is able to generate a button instruction in response to a user's pressing operation, so as to force the controller 70 to output the drive signal RELAY_EN2, thereby realizing the discharge output of the battery assembly to the external load.

It can be understood that a working mode of the controller 70 may include an automatic output mode and a forced output mode. In an implementation, the controller 70 enters the automatic output mode by default upon being energized. When the controller 70 is in the automatic output mode, the controller 70 does not output the drive signal RELAY_EN2 until it is determined that the external load is forwardly coupled to the load connection terminal 30 and a load voltage of the external load meets a preset condition. The controller 70 enters the forced output mode upon receiving a button instruction, and immediately outputs the drive signal RELAY_EN2 in response to the button instruction. In an implementation, the controller 70 resumes the automatic output mode after responding to the button instruction and outputting the drive signal RELAY_EN2.

In this implementation, the switch circuit 40 includes a switch element 41 and a switch drive module 42. The switch element 41 is electrically coupled between the power connection terminal 20 and the load connection terminal 30. Specifically, the switch element 41 is electrically coupled between the positive terminal BAT+ of the power connection terminal 20 and the positive terminal CAR+ of the load connection terminal 30. In another implementation, the switch element 41 may also be electrically coupled between the negative terminal BAT− of the power connection terminal 20 and the negative terminal CAR− of the load connection terminal 30. The switch element 41 may be an electromagnetic relay or a semiconductor power device such as a metal oxide semiconductor field effect transistor (MOSFET). In this implementation, the switch element 41 is an electromagnetic relay K1.

The switch drive module 42 is electrically coupled between the switch element 41 and the controller 70. The controller 70 is configured to transmit the drive signal RELAY_EN2 to the switch drive module 42 to turn on the switch element 41 through the switch drive module 42.

In this implementation, the smart connection device 100 further includes a reverse connection detection module 50 electrically coupled to the load connection terminal 30. The reverse connection detection module 50 is configured to detect a connection state of the external load through the load connection terminal 30, and output a corresponding control signal C_EN according to a detection result. The control signal C_EN includes a first control signal and a second control signal.

In this implementation, the reverse connection detection module 50 is also electrically coupled to the drive power source module 43. The reverse connection detection module 50 is further configured to transmit the control signal C_EN to the drive power source module 43 to control the drive power source module 43 to supply drive power to the switch circuit 40, or, to control the drive power source module 43 to suspend supplying the drive power to the switch circuit 40.

Specifically, the reverse connection detection module 50 outputs the first control signal when it detects that the external load is reversely coupled to the load connection terminal 30, and then transmits the first control signal to the drive power source module 43 to control the drive power source module 43 to suspend supplying the drive power to the switch circuit 40, so that the switch circuit 40 is de-energized and kept in an off and invalid state. In this way, an electrical connection between the battery assembly and the external load is disconnected. That is, the current output loop 11 used by the battery assembly to charge the external load is cut off, so as to prevent the battery assembly from providing the discharge output to the external load. It needs to be noted that, in the present disclosure, "reversely coupled/connected" can also be understood as "incorrectly connected/connected". Hereinafter, "reverse connection" or the like between the external load and the power connection terminal 21 means "incorrect connection".

The reverse connection detection module 50 is further configured to output the second control signal when it detects that the load connection terminal 30 is under a no-load state or the external load is forwardly coupled to the load connection terminal 30, and then transmit the second control signal to the drive power source module 43, to control the drive power source module 43 to supply the drive power to the switch circuit 40, so that the switch circuit 40 is energized and kept in an off and valid state. It can be understood that the on/off-state of the switch circuit 40 is not controllable by the controller 70 based on actual operating conditions unless the switch circuit 40 is in an energized state. In this way, the battery assembly is able to provide the discharge output to the external load, or the battery assembly is prevented from providing the discharge output to the external load.

Since the user can force, through the button module 82, the controller 70 to output the drive signal RELAY_EN2, therefore, when the external load is reversely coupled to the load connection terminal 30, the switch circuit 40 is de-energized, which can thus prevent the switch circuit 40 from responding to the drive signal RELAY_EN2 that is forced output by the controller 70 in response to a button instruction input by the user, so as to prevent the battery assembly from providing the discharge output to the external load, thereby ensuring electrical safety of the circuit. In addition, a transmission of the drive power that is supplied by the drive power source module 43 to the switch circuit 40 is directly controlled by the control signal output from the reverse connection detection module 50, an operation state of the switch circuit 40 is thus controlled, thereby achieving an objective of quickly responding to the first control signal that corresponds to the reverse connection state of the external load and an objective of cutting off the discharge output of the battery assembly to the external load in time.

Circuit structures and working principles of the drive power source module 43 and the reverse connection detection module 50 will be described below with reference to FIG. 2 and FIG. 3.

Referring to FIG. 2, in this implementation, the drive power source module 43 includes a drive power input terminal 431 and a control switch Q8. The control switch Q8 is electrically coupled between the drive power input terminal 431 and the switch circuit 40. The switch circuit 40 receives the drive power through the drive power input terminal 431.

Specifically, in this implementation, the drive power input terminal 431 is electrically coupled to the positive terminal BAT+ of the power connection terminal 20. Optionally, in another implementation, the drive power input terminal 431 may be electrically coupled to the voltage regulator module 81.

A first connection terminal S of the control switch Q8 is electrically coupled to the drive power input terminal 431 through a diode D3, where an anode of the diode D3 is electrically coupled to the drive power input terminal 431, and a cathode of the diode D3 is electrically coupled to the first connection terminal S of the control switch Q8. A second connection terminal D of the control switch Q8 is electrically coupled to the switch element 41. A control terminal G of the control switch Q8 is electrically coupled to the drive power input terminal 431 through a resistor R23 and the diode D3. The control terminal G of the control switch Q8 is also electrically coupled to the reverse connection detection module 50 through a resistor R26. In this way, the reverse connection detection module 50 is electrically coupled to the drive power source module 43, and the drive power source module 43 can receive the control signal C_EN that is output by the reverse connection detection module 50.

In other words, the drive power source module 43, the switch element 41, and the switch drive module 42 are electrically coupled to form a power supply loop of the switch element 41. The drive power input terminal 431 is configured to supply the drive power to the switch element 41. The control switch Q8 and the switch drive module 42 are configured to control an on/off-state of the power supply loop. The control switch Q8 is controlled by the control signal that is output from the reverse connection detection module 50, and the switch drive module 42 is controlled by the drive signal RELAY_EN2 that is output from the controller 70. The power supply loop is turned on when both the control switch Q8 and the switch drive module 42 are turned on, so as to energize the switch element 41, for example, energize a coil of a relay K1 to turn on the switch element 41.

In other words, the drive power source module 43, the switch element 41, and the switch drive module 42 are electrically coupled to form a drive loop of the switch element 41. The drive power input terminal 431 is configured to supply drive power to the drive loop, and the control switch Q8 and the switch drive module 42 are configured to control an on/off-state of the drive loop. The switch element 41 enters an on-state when the drive loop is turned on, and the drive loop is in the on-state when both the control switch Q8 and the switch drive module 42 are turned on.

Figure 3:
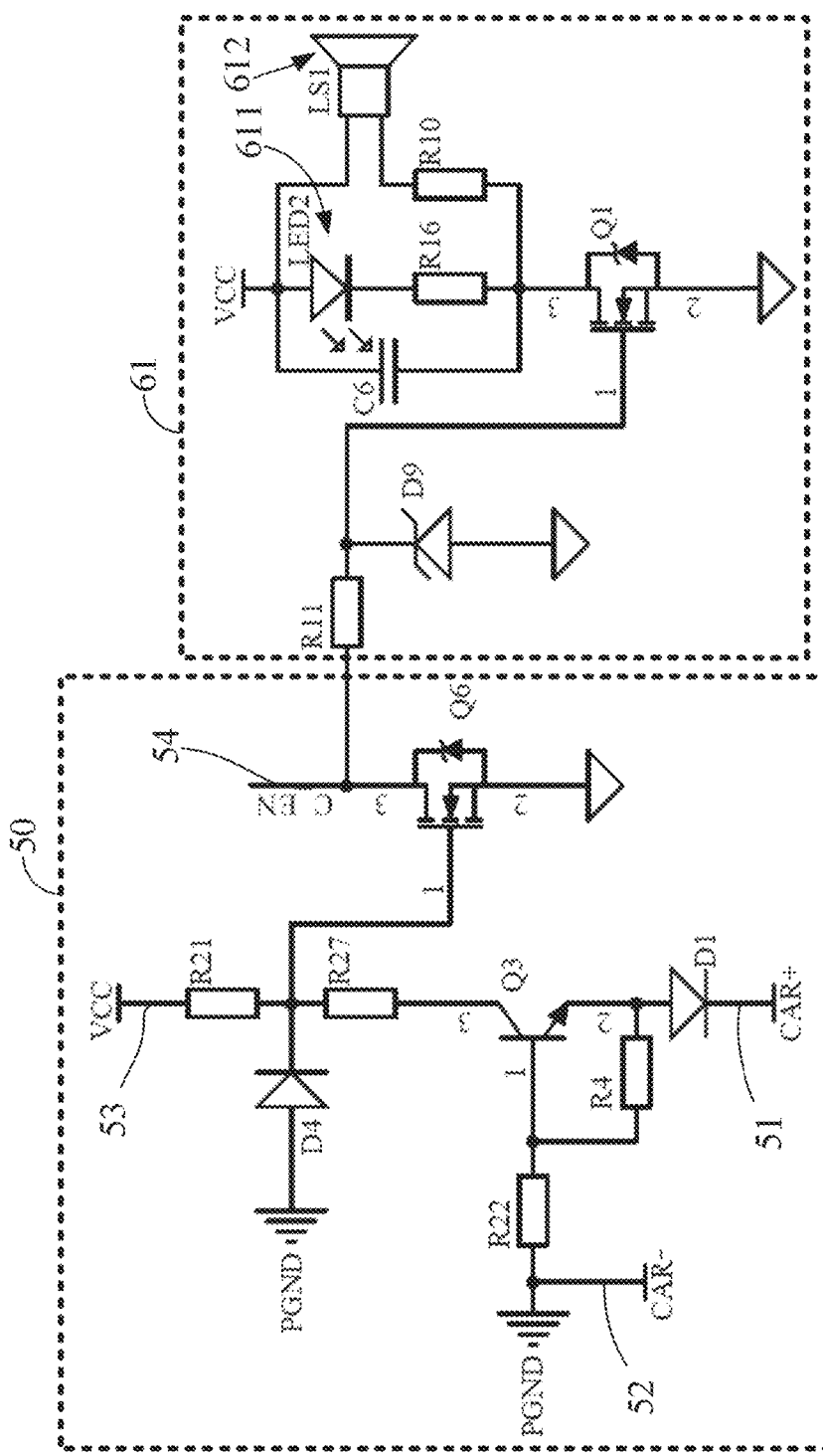
FIG. 3 is a circuit structure diagram of a reverse connection detection module and a reverse connection state indicating module of the smart connection device illustrated in FIG. 1.

Referring to FIG. 3, in this implementation, the reverse connection detection module 50 is a transistor-containing combined switch circuit, and includes a first detection terminal 51, a second detection terminal 52, a drive voltage input terminal 53, a control signal output terminal 54, a first transistor Q3, and a second transistor Q6. The first detection terminal 51 is electrically coupled to the positive terminal CAR+ of the load connection terminal 30, the second detection terminal 52 is electrically coupled to the negative terminal CAR− of the load connection terminal 30, and the negative terminal CAR− is further electrically coupled to the first ground terminal PGND. The drive voltage input terminal 53 is electrically coupled to a voltage source VCC, and the reverse connection detection module 50 receives, through the drive voltage input terminal 53, a drive voltage provided by the voltage source, so that the reverse connection detection module 50 can work normally. The voltage source VCC may be provided by the stable voltage VCC output from the voltage regulator module 81 or by the battery assembly electrically coupled to the power connection terminal 20. In this implementation, the voltage source is provided by the stable voltage VCC that is output from the voltage regulator module 81.

In this implementation, the first transistor Q3 is electrically coupled between the first detection terminal 51 and a control terminal 1 of the second transistor Q6. A control terminal 1 of the first transistor Q3 is electrically coupled to the second detection terminal 52. The second transistor Q6 is electrically coupled between the control signal output terminal 54 and a second ground terminal GND (a power reference ground, that is, the negative terminal BAT− of the power connection terminal 20). The control terminal 1 of the second transistor Q6 is further electrically coupled to the drive voltage input terminal 53 through a resistor R21.

Specifically, the control terminal 1 of the first transistor Q3 is electrically coupled to the second detection terminal 52 through a resistor R22, and electrically coupled to a first connection terminal 2 of the first transistor Q3 through a resistor R4. The first connection terminal 2 of the first transistor Q3 is also electrically coupled to the first detection terminal 51 through a diode D1, where a cathode of the diode D1 is electrically coupled to the first detection terminal 51, and an anode of the diode D1 is electrically coupled to the first connection terminal 2 of the first transistor Q3. A second connection terminal 3 of the first transistor Q3 is electrically coupled to the control terminal 1 of the second transistor Q6 through a resistor R27. The control signal output terminal 54 is further electrically coupled to the control terminal G of the control switch Q8 through a resistor R26, so that the reverse connection detection module 50 can transmit the control signal C_EN to the drive power source module 43.

In this implementation, the first transistor Q3 and the second transistor Q6 are transistors that are turned on at a high-level signal, such as an N-channel metal oxide semiconductor field effect transistor (hereinafter "NMOS transistor") or an NPN triode. The control switch Q8 is a transistor that is turned on at a low-level signal, such as a P-channel metal oxide semiconductor field effect transistor (hereinafter "PMOS transistor") or a PNP triode. In this implementation, the first transistor Q3 is an NPN triode, the second transistor Q6 is an NMOS transistor, and the control switch Q8 is a PMOS transistor. It can be understood that the reverse connection detection module 50 realizes, by employing simple transistors (such as diodes, triodes, and field effect transistors) and passive devices (such as resistors and capacitors), the function of detecting the polarity of the electrodes of the external load electronically coupled to the load connection terminal 30, so that the reverse connection state of the external load can be detected rapidly based on quick turn-on and quick turn-off characteristics of the transistors, thereby significantly improving the detection speed and effectiveness of related protection functions.

During operation, the reverse connection detection module 50 outputs the control signal C_EN to the control terminal G of the control switch Q8 to switch an on/off-state of the control switch Q8, so as to control a transmission of the drive power that is supplied by the drive power source module 43 to the switch circuit 40, and thus control the discharge output of the battery assembly to the external load.

Specifically, if the external load is reversely coupled to the load connection terminal 30, that is, the positive electrode of the external load is electrically coupled to the negative terminal CAR− of the load connection terminal 30, and the negative electrode of the external load is electrically coupled to the positive terminal CAR+ of the load connection terminal 30, then the control terminal 1 of the first transistor Q3 receives a high-level signal provided by the positive electrode of the external load, so as to turn on the first transistor Q3. The control terminal 1 of the second transistor Q6 is electrically coupled to the negative electrode of the external load through the turned-on first transistor Q3 to receive a low-level signal, so as to turn off the second transistor Q6. The control terminal G of the control switch Q8 and the control signal output terminal 54 are electrically coupled to the drive power input terminal 431, so as to be in a high-level state. In this case, the control signal output terminal 54 outputs the first control signal, where the first control signal is a high-level signal.

The control switch Q8 enters an off-state because its control terminal G is in the high-level state. In other words, the control switch Q8 enters the off-state because its control terminal G receives the first control signal (high-level signal) that is output from the control signal output terminal 54 of the reverse connection detection module 50, so as to disconnect an electrical connection between the drive power input terminal 431 and the switch circuit 40, and thus make the drive power input terminal 431 suspend supplying the drive power to the switch circuit 40, so that the switch circuit 40 is de-energized and kept in the off and invalid state. In other words, a drive voltage of the coil of the relay K1 is cut off, so that the relay K1 is kept in the off-state because the coil is de-energized.

If the load connection terminal 30 is under the no-load state or the external load is forwardly coupled to the load connection terminal 30, that is, the positive electrode of the external load is electrically coupled to the positive terminal CAR+ of the load connection terminal 30, and the negative electrode of the external load is electrically coupled to the negative terminal CAR− of the load connection terminal 30, then the control terminal 1 of the first transistor Q3 is electrically coupled to the first ground terminal PGND to receive a low-level signal, so as to turn off the transistor Q3. The control terminal 1 of the second transistor Q6 is electrically coupled to the drive voltage input terminal 53 through the resistor R21 to receive a high-level signal, so as to turn on the second transistor Q6. The control signal output terminal 54 is electrically coupled to the second ground terminal GND through the turned-on second transistor Q6, so as to be in a low-level state. In this case, the control signal output terminal 54 outputs the second control signal, where the second control signal is a low-level signal.

The control switch Q8 enters an on-state because its control terminal G receives the second control signal (low-level signal) that is output from the control signal output terminal 54 of the reverse connection detection module 50, so as to turn on the electrical connection between the drive power input terminal 431 and the switch circuit 40, and thus allow the drive power input terminal 431 to supply the drive power to the switch circuit 40, so that the switch circuit 40 is energized and kept in the off and valid state.

It can be understood that, in this implementation, the control switch Q8 is normally in the on-state by default, so that the switch circuit 40 is normally energized and kept in the off and valid state.

In the smart connection device 100 provided in the present disclosure, the reverse connection detection module 50 is the transistor-containing combined switch circuit, so that the reverse connection state of the external load can be quickly detected based on the fast turn-on and fast turn-off characteristics of the transistors. In addition, a transmission of the drive power that is supplied by the drive power source module 43 to the switch circuit 40 is directly controlled by the control signal output from the reverse connection detection module 50, the operation state of the switch circuit 40 is thus controlled, thereby achieving the objective of quickly responding to the first control signal that corresponds to the reverse connection state of the external load and the objective of cutting off the discharge output of the battery assembly to the external load in time. It can be seen that the smart connection device provided in the present disclosure can significantly improve the detection speed and effectiveness of related protection functions, and therefore, can significantly improve safety and reliability of a power output control system. In addition, the key components of the smart connection device provided in the present disclosure are low in cost, and peripheral circuits of the device are simple and reliable, thereby not only reducing the material cost of a product, but also saving the cost of human resources and materials in after-sales services of the product.

It can be understood that in another implementation, the reverse connection detection module 50 may be a detection circuit composed of a sensor device, for example, an optocoupler, to implement the reverse connection detection function of the external load.

Referring to FIG. 1 again, in this implementation, the smart connection device 100 further includes a reverse connection state indicating module 61 electrically coupled to the reverse connection detection module 50. The reverse connection detection module 50 is further configured to transmit the first control signal to the reverse connection state indicating module 61, to control the reverse connection state indicating module 61 to raise an alarm signal for indicating a reverse connection alarm prompt.

Referring to FIG. 3, the reverse connection state indicating module 61 includes a switch unit Q1, a display unit 611, and/or an alarm unit 612. The display unit 611 includes at least one light-emitting diode or at least one liquid crystal display device. The display unit 611 is electrically coupled to the reverse connection detection module 50. The reverse connection detection module 50 is further configured to transmit the first control signal to the display unit 611 to control the display unit 611 to emit light or display information for indicating the reverse connection alarm prompt.

The alarm unit 612 includes at least one buzzer or loudspeaker. The alarm unit 612 is electrically coupled to the reverse connection detection module 50. The reverse connection detection module 50 is further configured to transmit the first control signal to the alarm unit 612 to control the alarm unit 612 to raise an alarm sound for indicating the reverse connection alarm prompt.

In this implementation, the reverse connection state indicating module 61 includes a display unit 611 and an alarm unit 612. The display unit 611 includes a light emitting diode LED 2, and the alarm unit 612 includes a loudspeaker LS1. The control terminal 1 of the switch unit Q1 is electrically coupled to the control signal output terminal 54 of the reverse connection detection module 50 through a resistor R11, and is electrically coupled to the second ground terminal GND through a Zener diode D9. The first connection terminal 2 of the switch unit Q1 is electrically coupled to the second ground terminal GND. The light emitting diode LED 2 and the alarm unit 612 are electrically coupled in parallel between the voltage source VCC and the second connection terminal 3 of the switch unit Q1. An anode of the light emitting diode LED 2 is electrically coupled to the voltage source VCC, and a cathode of the light emitting diode LED 2 is electrically coupled to the second connection terminal 3 of the switch unit Q1 through a resistor R16. The loudspeaker LS1 is electrically coupled to the second connection terminal 3 of the switch unit Q1 through a resistor R10. The second connection terminal 3 of the switch unit Q1 is further electrically coupled to the voltage source VCC through a capacitor C6.

In this implementation, the switch unit Q1 is a transistor that is turned on at a high-level signal, such as an NMOS transistor or an NPN triode.

During operation, if the external load is reversely coupled to the load connection terminal 30, as described above, the control signal output terminal 54 outputs the first control signal, where the first control signal is a high-level signal. The switch unit Q1 enters an on-state because its control terminal 1 receives the first control signal (high-level signal) that is output from the control signal output terminal 54 of the reverse connection detection module 50, so as to turn on the loop in which the light emitting diode LED 2 and the loudspeaker LS1 are included. Therefore, the light emitting diode LED2 emits light, and the loudspeaker LS1 raises an alarm sound to remind that the external load is reversely coupled to the load connection terminal 30.

If the load connection terminal 30 is under the no-load state or the external load is forwardly coupled to the load connection terminal 30, as described above, the control signal output terminal 54 outputs the second control signal, where the second control signal is a low-level signal. The switch unit Q1 enters an off-state because its control terminal 1 receives the second control signal (low-level signal) that is output from the control signal output terminal 54 of the reverse connection detection module 50, so as to cut off the loop in which the light emitting diode LED 2 and the loudspeaker LS1 are included. Therefore, the light emitting diode LED 2 emits no light, and the loudspeaker LS1 raises no alarm sound.

In the smart connection device 100 provided in the present disclosure, the working state of the reverse connection state indicating module 61 is directly controlled by the control signal output from the reverse connection detection module 50, so as to achieve the objective of quickly responding to the first control signal that corresponds to the reverse connection state of the external load and an objective of raising a reverse connection state alarm to the user in time. In this way, the user can adjust the electrical connection between the smart connection device 100 and the external load in time.

Referring to FIG. 1 again, the smart connection device 100 further includes a load voltage detection module 83 electrically coupled to the load connection terminal 30. The load voltage detection module 83 is configured to detect a load voltage of the external load through the load connection terminal 30, and output a corresponding load voltage signal.

The controller 70 is further electrically coupled to the load voltage detection module 83. The controller 70 is further configured to receive, when in an automatic output mode, the load voltage signal that is output from the load voltage detection module 83, and determine a connection state and a voltage change state of the external load according to the load voltage signal. The controller 70 is further configured to output the drive signal RELAY_EN2 to the switch circuit 40 when it is determined that the external load is forwardly coupled to the load connection terminal 30 and the load voltage of the external load meets a preset condition, so as to turn on the switch circuit 40 that is in an energized and valid state. In this way, the battery assembly is enabled to be electrically coupled to the external load, and provide the discharge output to the external load.

Taking an example in which the external load is a battery of a vehicle, and the battery assembly is a built-in battery module of a jump starter, in an implementation, the controller 70 is configured to determine, based on the load voltage signal received within a preset time duration, whether a voltage drop of the battery of the vehicle within the preset time duration exceeds a preset drop threshold, that is, determine whether the voltage of the battery of the vehicle has incurred a voltage sag. The controller 70 is further configured to determine that the load voltage of the battery of the vehicle meets the preset condition, when it is determined that the voltage drop of the battery of the vehicle within the preset time duration exceeds the preset drop threshold, that is, the voltage of the battery of the vehicle has incurred a voltage sag, and a slope of the voltage sag reaches a preset drop slope, so as to output the drive signal RELAY_EN2 to turn on the switch circuit 40, and then the battery of the vehicle is powered/charged by the jump starter. It can be understood that if the voltage drop of the battery of the vehicle within the preset time duration exceeds the preset drop threshold, that is, the voltage of the battery of the vehicle has incurred a voltage sag, it indicates that the battery of the vehicle is in use for starting the vehicle. In this case, by turning on the switch circuit 40, the battery of the vehicle can be powered/charged by the jump starter to start the vehicle. It can be understood that the controller 70 does not turn on the switch circuit 40 until the battery of the vehicle is in use for starting the vehicle. In this way, the power of the jump starter is saved, and it is ensured that the vehicle can be started.

In another implementation, the controller 70 is configured to determine, based on the received load voltage signal, whether the voltage value of the battery of the vehicle is less than a preset voltage threshold. When it is determined that the voltage value of the battery of the vehicle is less than the preset voltage threshold, the controller 70 is further configured to determine, based on the load voltage signal received within the preset time duration, whether the voltage drop of the battery of the vehicle within the preset time duration exceeds the preset drop threshold. When it is determined that the voltage drop of the battery of the vehicle within the preset time duration exceeds the preset drop threshold, the controller 70 is further configured to determine that the load voltage of the battery of the vehicle meets the preset condition, and output the drive signal RELAY_EN2 to turn on the switch circuit 40, so that the battery of the vehicle is powered/charged by the jump starter. It can be understood that if the voltage value of the battery of the vehicle is less than the preset voltage threshold, it indicates that the battery of the vehicle is insufficient in electric quantity, or is in a state of lacking of electricity. If the voltage drop of the battery of the vehicle within the preset time duration exceeds the preset drop threshold, it indicates that the battery of the vehicle is in use for starting the vehicle. In this way, the controller 70 does not turn on the switch circuit 40 until the smart connection device 100 is forwardly coupled with the battery of the vehicle that is in the state of lacking of electricity and until the battery of the vehicle is in use for starting the vehicle. In this way, it can not only save the power of the jump starter, but also ensure that the vehicle can be started, and the battery of the vehicle is prevented from reversely charging the jump starter.

In an implementation, the smart connection device 100 further includes a load connection state indicating module 60. The load connection state indicating module 60 may include a forward connection state indicating module 62 and the reverse connection state indicating module 61. The controller 70 may further control, when it is determined that the external load is forwardly coupled to the load connection terminal 30, the forward connection state indicating module 62 to raise an indication signal as a corresponding working state indication available to the user. The forward connection state indicating module 62 may include at least one light emitting diode or at least one buzzer.

The controller 70 may be a programmable control device, such as a micro-controller unit (MCU), a field-programmable gate array (FPGA), or a digital signal processor (DSP). The controller 70 serves as a logic operation and control center of the smart connection device 100, and is mainly responsible for data collection and conversion, logic operation, data communication, drive output, and other functions. The controller 70 is powered by the stable voltage VCC that is output from the voltage regulator module 81.

Figure 4:
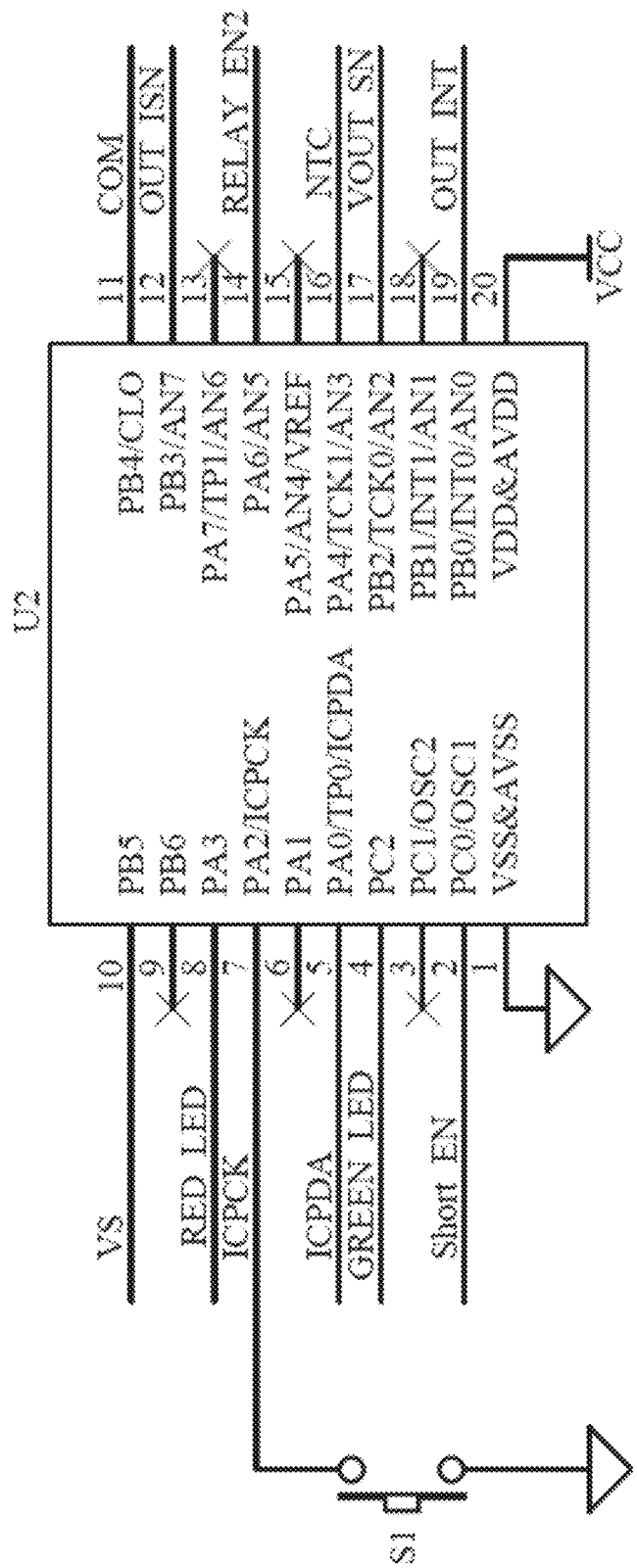
FIG. 4 is a schematic structural diagram of a controller illustrated in FIG. 1.

In this implementation, as illustrated in FIG. 4, the controller 70 is a microcontroller U2 that may include a plurality of input and output ports. The controller 70 may communicate and exchange information with other functional modules or external devices through the plurality of input and output ports, so that the smart connection device 100 can implement the functions such as connection, driving, and control.

In this implementation, the smart connection device 100 further includes a communication interface module (not shown) electrically coupled to the controller 70. A communications connection may be implemented between the controller 70 and the external device (external power supply device, or external load) through the communication interface module. In this way, the controller 70 can obtain information such as a current battery voltage, a maximum current output capacity, a battery temperature, operation state, and software version of the battery assembly of the external power supply device, and determine, based on the obtained relevant information, whether electrical parameters of the battery assembly of the external power supply device meets a condition of providing a discharge output to the external load, so as to determine whether to output the drive signal RELAY_EN2 to turn on the switch circuit 40. It can be understood that the controller 70 may also send its own software version information, normal and abnormal operation state of the smart connection device 100, voltage and output current signals of the external load, and the like to the external power supply device for adaptation and related protection. In other words, through the communication interface module, the controller 70 of the smart connection device 100 can exchange information with the external device and perform corresponding control.

It can be understood that when the communication provided by the communication interface module is interrupted due to timeout or the data exchanged through the communication interface module is abnormal, or when the voltage provided by the external power supply device is not within a threshold range set by a program, the controller 70 stops outputting the drive signal RELAY_EN2, thereby turning off the switch circuit 40 and cutting off the current output loop 11, and at the same time, corresponding state indications being output, so as to ensure safety of the system and external device.

Optionally, the smart connection device 100 further includes a temperature detection module 84 electrically coupled to the controller 70. The temperature detection module 84 is configured to detect an operating temperature of the switch element 41 and/or a built-in battery assembly, and the like, and feed back the detected temperature value to the controller 70. The controller 70 further determines, according to the received temperature value, whether the operating temperature of the switch element 41 and/or the built-in battery assembly exceeds a preset threshold, and, when it is determined that the operating temperature of the switch element 41 and/or the built-in battery assembly exceeds the preset threshold, suspends outputting the drive signal RELAY_EN2, so as to turn off the switch circuit 40 and cut off the current output loop 11 to ensure the safety of system operation.

Optionally, the smart connection device 100 further includes a current detection module 85 electrically coupled between the power connection terminal 20 and the load connection terminal 30. The current detection module 85 is further electrically coupled to the controller 70. The current detection module 85 is configured to collect a current in the current output loop 11 in real time while the switch circuit 40 is in the on-state, and feed back a detected current sampling signal to the controller 70, where the current is a discharge current output by the battery assembly to the external load. In this implementation, the current detection module 85 is electrically coupled between the negative terminal BAT− of the power connection terminal 20 and the negative terminal CAR− of the load connection terminal 30. In another implementation, the current detection module 85 may also be electrically coupled between the positive terminal BAT+ and the positive terminal CAR+. The controller 70 further determines, based on the received current sampling signal, whether the discharge output of the battery assembly is normal, and, when it is determined that the discharge output of the battery assembly is abnormal, suspends outputting the drive signal RELAY_EN2, so as to turn off the switch circuit 40 and cut off the current output loop 11 to ensure the safety of system operation.

Optionally, the smart connection device 100 further includes an over-current and short-circuit protection module 86 that is electrically coupled to the current detection module 85 and the controller 70. The over-current and short-circuit protection module 86 is configured to monitor whether a value of the current sampling signal output by the current detection module 85 exceeds a preset threshold value, and, when it is determined that the value of the current sampling signal exceeds the preset threshold value, output a suspension trigger signal to the controller 70, so that the controller 70 immediately suspends outputting the drive signal RELAY_EN2. In this way, the switch circuit 40 can be quickly turned off to cut off the current output loop 11 and ensure the safety of system operation. In another implementation, an output terminal of the over-current and short-circuit protection module 86 may also be directly connected to the switch circuit 40, so that the switch circuit 40 is directly turned off when the value of the current sampling signal exceeds the preset threshold value.

A person skilled in the art can understand that the foregoing schematic diagram 1 shows merely an example of the smart connection device 100 that implements the function of detecting the connection state of the external load and the function of providing a discharge output by the battery assembly to the external load according to the present disclosure, and does not constitute any limitation on the smart connection device 100. The smart connection device 100 may include more or fewer components than those illustrated in the schematic diagram, or may combine some components or different components.

Figure 5:
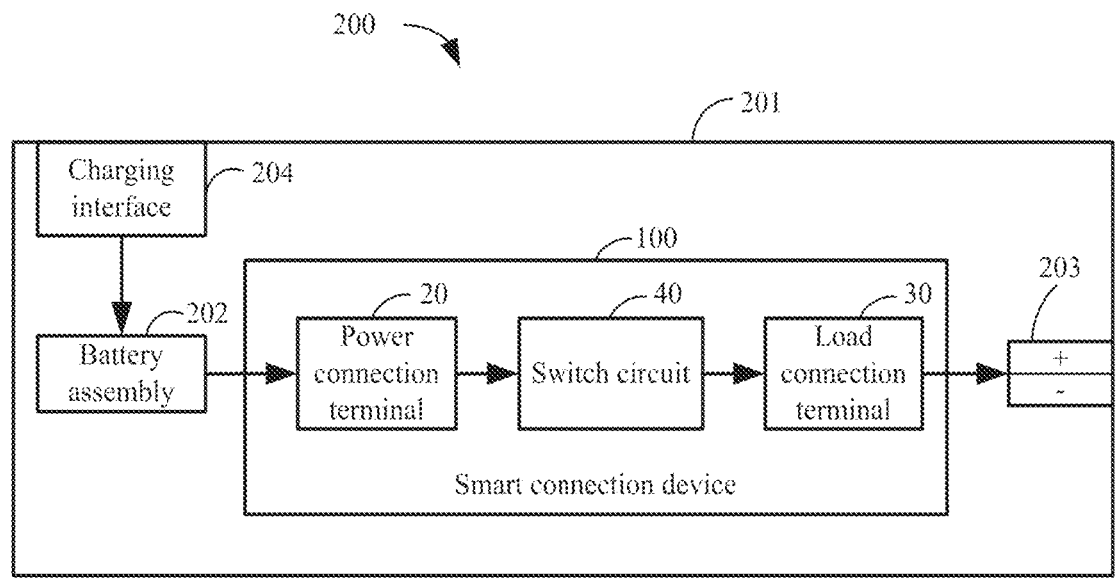
FIG. 5 is a schematic diagram of functional modules of a jump starter according to an implementation of the present disclosure.
Figure 6:
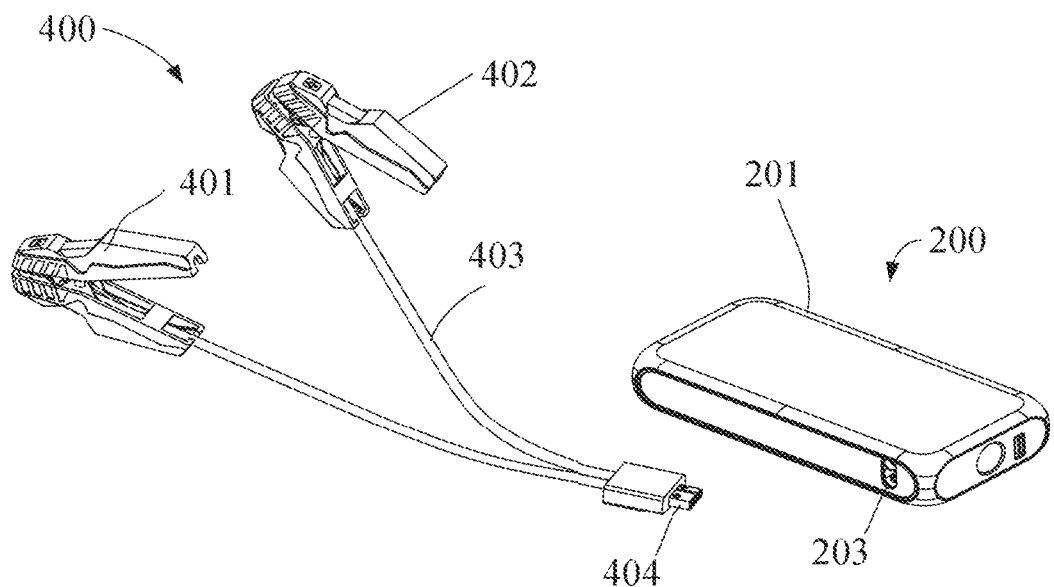
FIG. 6 is a structural diagram of the jump starter illustrated in FIG. 5.

Referring to FIG. 5 to FIG. 6, the present disclosure further provides a jump starter 200 that employs the smart connection device 100. As illustrated in FIG. 5, the jump starter 200 further includes a housing 201 and a battery assembly 202. The battery assembly 202 and at least a part of structures of the smart connection device 100, such as the power connection terminal 20, the load connection terminal 30, the switch circuit 40, the drive power source module 43, the reverse connection detection module 50, the controller 70, the voltage regulator module 81, the load voltage detection module 83, the temperature detection module 84, the current detection module 85, the over-current and short-circuit protection module 86, etc., may be provided in the housing 201. At least a part of the structures of the smart connection device 100, such as the load connection state indicating module 60, the button module 82, etc., may be provided on the housing 201.

In this implementation, the jump starter 200 further includes a charging interface 204 provided on the housing 201. The charging interface 204 is configured to electrically couple with an external power supply such as a mains supply to receive power from the external power supply and charge the battery assembly 202. The type of the charging interface 204 includes but is not limited to a DC interface, a USB interface, a micro USB interface, a mini USB interface, a type-A interface, and a type-C interface.

The power connection terminal 20 of the smart connection device 100 is electrically coupled to the battery assembly 202 of the jump starter 200.

In this implementation, as illustrated in FIG. 5 and FIG. 6, the jump starter 200 further includes a connection socket 203 provided on the housing 201. The connection socket 203 is electrically coupled to the load connection terminal 30 of the smart connection device 100. The connection socket 203 is configured to electrically couple with the external load through an external connection element 400. Specifically, one end of the connection element 400 is detachably connected to the connection socket 203, and the other end is detachably connected to the external load. An appearance structure of the jump starter 200 may be the structure of the jump starter 200 illustrated in FIG. 6 or another structure, and the appearance structure of the jump starter 200 is not specifically limited in the present disclosure.

In this implementation, the connection element 400 is a wire clamp including a first wire clamp 401, a second wire clamp 402, cables 403, and a connection plug 404. The cables 403 is configured to connect the first wire clamp 401 and the second wire clamp 402 to the connection plug 404 respectively. The connection plug 404 is electrically and detachably connected to the connection socket 203. The first wire clamp 401 is configured to clamp the positive electrode of the external load, and the second wire clamp 402 is configured to clamp the negative electrode of the external load. Under a correct operation, the positive electrode and the negative electrode of the external load are electrically coupled to the positive terminal CAR+ and the negative terminal CAR− of the load connection terminal 30 in a one-to-one correspondence through the first wire clamp 401, the second wire clamp 402, the connection plug 404, and the connection socket 203.

Figure 7:
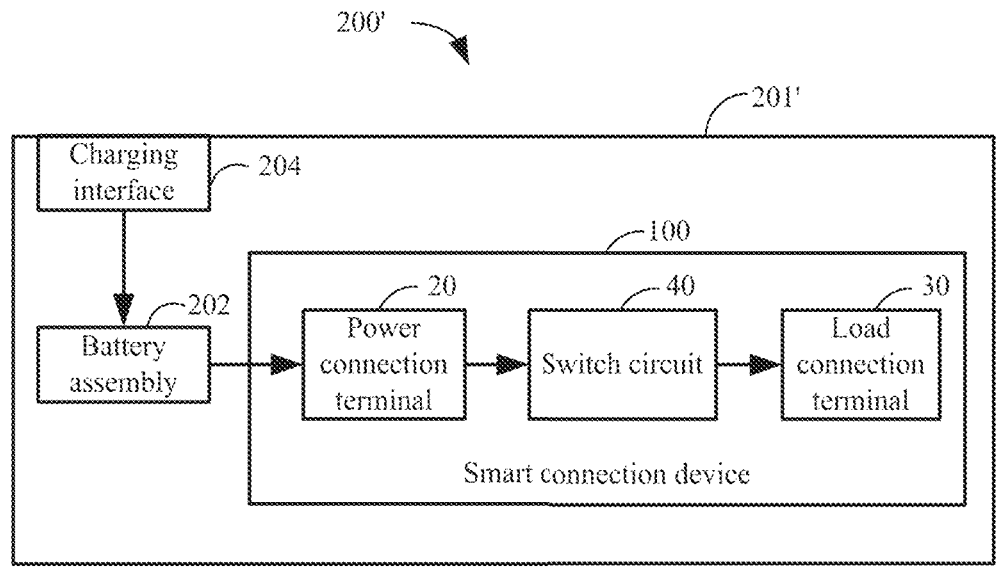
FIG. 7 is a schematic diagram of functional modules of a jump starter according to another implementation of the present disclosure.
Figure 8:
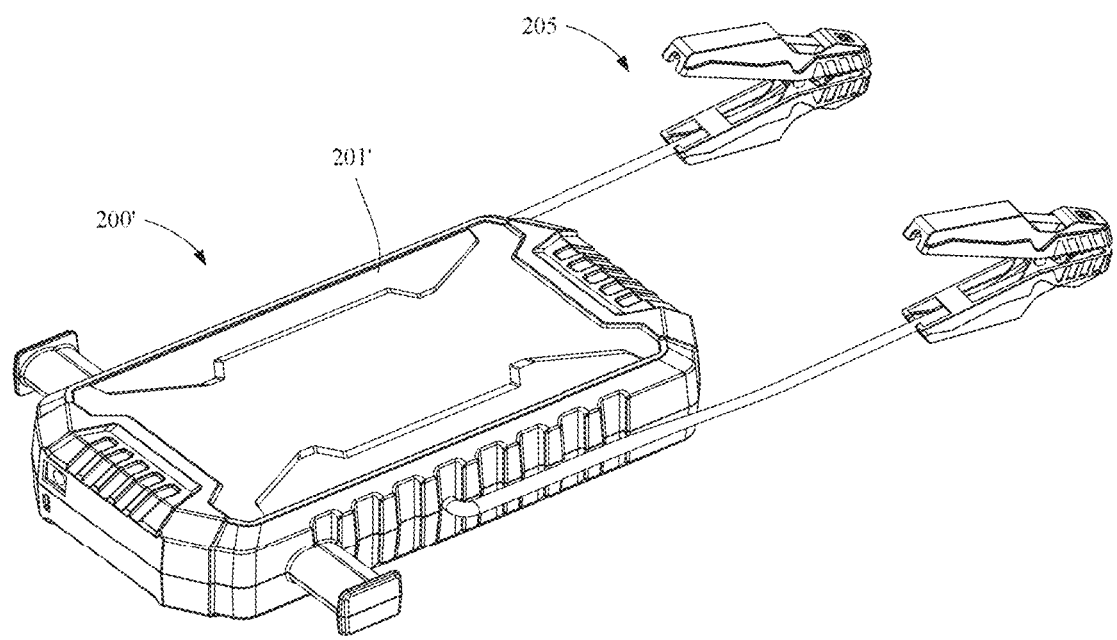
FIG. 8 is a structural diagram of the jump starter illustrated in FIG. 7.

Optionally, in another implementation, as illustrated in FIG. 7 and FIG. 8, a jump starter 200' further includes a connection element 205. One end of the connection element 205 is electrically coupled to the load connection terminal 30 of the smart connection device 100, and the other end is configured to electrically couple with the external load. In other words, one end of the connection element 205 is built in the start-up power source 200'. In the another implementation, the connection element 205 is a wire clamp, where the connection element 205 is structurally similar to the connection element 400 except that no connection plug 404 is included, and its details are not described herein again.

By employing the smart connection device 100, the jump starters 200 and 200' provided in the present disclosure can directly control, by using the control signal output from the reverse connection detection module 50, a transmission of the drive power that is supplied by the drive power source module 43 to the switch circuit 40, the operation state of the switch circuit 40 is thus controlled, thereby achieving the objective of quickly responding to the first control signal that corresponds to the reverse connection state of the external load and the objective of cutting off the discharge output of the battery assembly to the external load in time, so as to significantly improve the detection speed and effectiveness of related protection functions, and therefore, can significantly improve the safety and reliability of the power output control system. In addition, the key components of the smart connection device provided in the present disclosure are low in cost, and peripheral circuits of the device are simple and reliable, thereby not only reducing the material cost of the jump starter 200 or 200', but also saving the cost of human resources and materials in after-sales services of the jump starter 200 or 200'.

Figure 9:
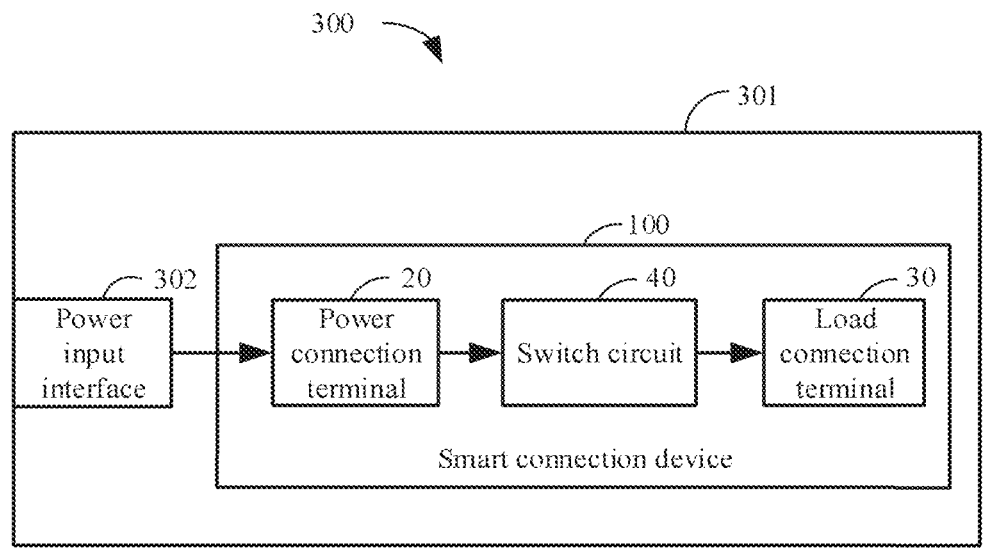
FIG. 9 is a schematic diagram of functional modules of a battery clamp according to an implementation of the present disclosure.
Figure 10:
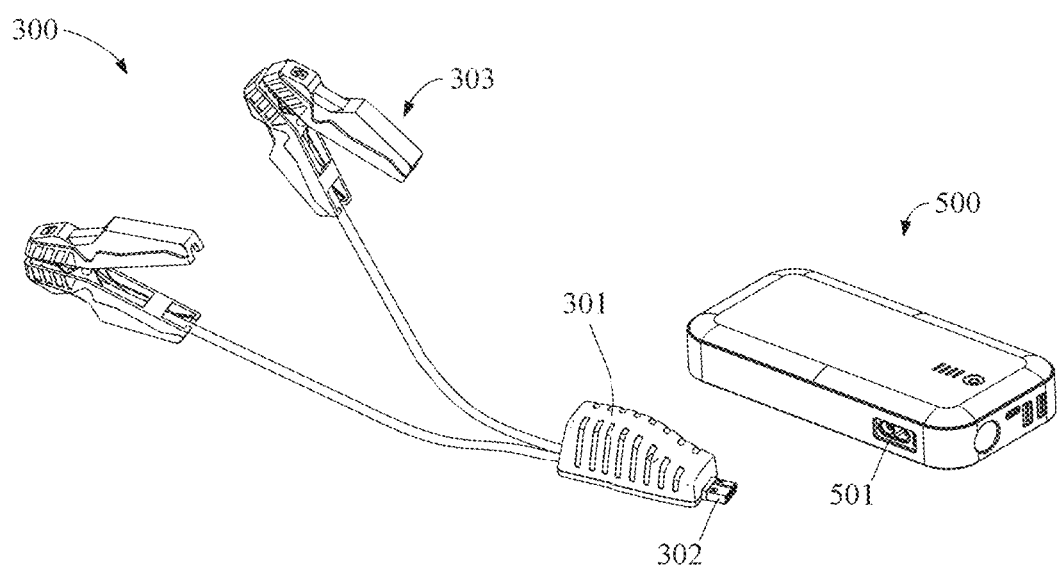
FIG. 10 is a structural schematic diagram of the battery clamp illustrated in FIG. 9.

Referring to FIG. 9 and FIG. 10, the present disclosure further provides a battery clamp 300 that employs the smart connection device 100. As illustrated in FIG. 9 and FIG. 10, the battery clamp 300 further includes a housing 301, a power input interface 302, and a connection element 303. The power input interface 302 is provided on the housing 301, and the power input interface 302 is configured to electrically couple with an external power supply device 500 such as an emergency jump starter, where the external power supply device 500 includes a battery module (not shown). In this implementation, the power input interface 302 is a connection terminal. The external power supply device 500 further includes a connection socket 501 that matches the power input interface 302 of the battery clamp 300. The battery clamp 300 is electrically coupled to the external power supply device 500 through a detachable electrical connection between the power input interface 302 and the connection socket 501.

In this implementation, at least a part of structures of the smart connection device 100, such as the power connection terminal 20, the load connection terminal 30, the switch circuit 40, the drive power source module 43, the reverse connection detection module 50, the controller 70, the voltage regulator module 81, the load voltage detection module 83, the temperature detection module 84, the current detection module 85, the over-current and short-circuit protection module 86, etc., may be provided in the housing 301. At least a part of the structures of the smart connection device 100, such as the load connection state indicating module 60, the button module 82, etc., may be provided on the housing 301.

The power connection terminal 20 of the smart connection device 100 is electrically coupled to the power input interface 302, and is electrically coupled to the battery module of the external power supply device 500 through the power input interface 302.

One end of the connection element 303 is electrically coupled to the load connection terminal 30 of the smart connection device 100, and the other end is configured to electrically couple with an external load. In this implementation, the connection element 303 is a wire clamp. The connection element 303 is structurally similar to the connection element 400 except that no connection plug 404 is included, and its details are not described herein again.

An appearance structure of the battery clamp 300 may be the structure of the battery clamp 300 illustrated in FIG. 10 or another structure, and the appearance structure of the battery clamp 300 is not specifically limited in the present disclosure.

By employing the smart connection device 100, the battery clamp 300 provided in the present disclosure can directly control, by using the control signal output from the reverse connection detection module 50, a transmission of the drive power that is supplied by the drive power source module 43 to the switch circuit 40, the operation state of the switch circuit 40 is thus controlled, thereby achieving the objective of quickly responding to the first control signal that corresponds to the reverse connection state of the external load and the objective of cutting off the discharge output of the battery assembly to the external load in time, so as to significantly improve the detection speed and effectiveness of related protection functions, and therefore, can significantly improve the safety and reliability of the power output control system. In addition, the key components of the smart connection device provided in the present disclosure are low in cost, and peripheral circuits of the device are simple and reliable, thereby not only reducing the material cost of the battery clamp 300, but also saving the cost of human resources and materials in after-sales services of the battery clamp 300.

Finally, it should be noted that the above implementations are only used to illustrate the technical solutions of the present disclosure, not to limit it. Although the present disclosure has been described in detail with reference to the above preferred implementations, those skilled in the art should understand that modification or equivalent replacement of the technical solution of the present disclosure should not depart from the spirit and scope of the technical solution of the present disclosure.

What is claimed is:

1. A smart connection device, comprising:
   a power connection terminal configured to electrically couple with an energy storage module;
   a load connection terminal configured to electrically couple with an external load;
   a switch element electrically coupled between the power connection terminal and the load connection terminal;
   a power supply loop of the switch element; and
   a reverse connection detection module electrically coupled to the load connection terminal and the power supply loop, respectively, wherein the reverse connection detection module is configured to output a first control signal to the power supply loop when it detects that the external load is reversely coupled to the load connection terminal;
   wherein the power supply loop is in a disconnection state and supplies no power to the switch element when the power supply loop receives the first control signal; wherein the switch element is in an off state when the switch element receives no power supply, so as to make the power connection terminal and the load connection terminal be in a disconnection state, thereby preventing the energy storage module from providing a discharge output to the external load.

2. The smart connection device of claim 1, wherein the smart connection device further comprises a reverse connection state indicating module electrically coupled to the reverse connection detection module, wherein the reverse connection detection module is further configured to output the first control signal to the reverse connection state indicating module, to control the reverse connection state indicating module to raise an alarm signal for indicating a reverse connection alarm prompt.

3. The smart connection device of claim 1, wherein the smart connection device further comprises a drive power source module, wherein the drive power source module and the switch element are coupled in series in the power supply loop; the drive power source module is configured to receive power supply, and supply the power to the switch element;
   the reverse connection detection module is further electrically coupled to the drive power source module, and outputs the first control signal to the drive power source module; and
   the drive power source module disconnects the power supply loop and supplies no power to the switch element when the drive power source module receives the first control signal.

4. The smart connection device of claim 3, wherein the reverse connection detection module is further configured to output a second control signal when it detects that the load connection terminal is under a no-load state or the external load is forwardly coupled to the load connection terminal, and then transmit the second control signal to the drive power source module, to control the drive power source module to supply power to the switch element.

5. The smart connection device of claim 3, wherein the drive power source module comprises a drive power input terminal and a control switch, wherein the control switch is electrically coupled between the drive power input terminal and the switch element; wherein the switch element receives the power through the drive power input terminal; the control switch is configured to turn on or disconnect an electrical connection between the drive power input terminal and the switch element.

6. The smart connection device of claim 4, wherein the drive power source module comprises a drive power input terminal and a control switch, wherein the control switch is electrically coupled between the drive power input terminal and the switch element; wherein the switch element receives the power through the drive power input terminal;
   the reverse connection detection module is configured to output the first control signal to the control switch to make the control switch be in an off state, so as to disconnect an electrical connection between the drive power input terminal and the switch element, thereby preventing the drive power input terminal from supplying power to the switch element;
   the reverse connection detection module is further configured to output the second control signal to the control switch to make the control switch be in an on state, so as to conduct the electrical connection between the drive power input terminal and the switch element, thereby allowing the drive power input terminal to supply power to the switch element.

7. The smart connection device of claim 6, wherein the load connection terminal comprises a positive terminal and a negative terminal, wherein the negative terminal of the load connection terminal is electrically coupled to a first ground terminal;
   wherein the reverse connection detection module comprises:
   a first detection terminal electrically coupled to the positive terminal of the load connection terminal;
   a second detection terminal electrically coupled to the negative terminal of the load connection terminal;
   a drive voltage input terminal, wherein the reverse connection detection module receives a drive voltage through the drive voltage input terminal;
   a control signal output terminal; and
   a first transistor and a second transistor, wherein the first transistor is electrically coupled between the first detection terminal and a control terminal of the second transistor, wherein a control terminal of the first transistor is electrically coupled to the second detection terminal; the second transistor is electrically coupled between the control signal output terminal and a second ground terminal, wherein the control terminal of the second transistor is further electrically coupled to the drive voltage input terminal through a resistor.

8. The smart connection device of claim 7, wherein the control terminal of the control switch is electrically coupled to the control signal output terminal and the drive power input terminal respectively; wherein the first transistor and the second transistor are transistors that are turned on at a high-level signal, and the control switch is a transistor that is turned on at a low-level signal;
   wherein when the external load is reversely coupled to the load connection terminal, the first transistor is turned on, the second transistor is turned off, and the control terminal of the control switch and the control signal output terminal are in a high-level state because they are electrically coupled to the drive power input terminal, so that the control switch enters the off-state, and the control signal output terminal is caused to output the first control signal, wherein the first control signal is a high-level signal;

when the load connection terminal is under the no-load state or the external load is forwardly coupled to the load connection terminal, the first transistor is turned off, the second transistor is turned on, and the control signal output terminal is in a low-level state because it is electrically coupled to the second ground terminal through the turned-on second transistor, and outputs the second control signal, so that the control switch enters the on-state, wherein the second control signal is a low-level signal.

9. The smart connection device of claim 3, wherein the smart connection device further comprises a controller electrically coupled to the power supply loop, wherein the controller is configured to output a drive signal to conduct the power supply loop.

10. The smart connection device of claim 9, wherein the smart connection device further comprises a switch drive module electrically coupled to the controller, wherein the drive power source module, the switch element, and the switch drive module are coupled in series in the power supply loop;

the controller is electrically coupled to the switch drive module, and outputs the drive signal to the switch drive module; and the power supply loop is conducted when the switch drive module receives the drive signal and the drive power source module does not receive the first control signal.

11. The smart connection device of claim 9, wherein the smart connection device further comprises a button module electrically coupled to the controller, wherein the button module is configured to generate a button instruction in response to a user's pressing operation, so as to cause the controller to output the drive signal.

12. The smart connection device of claim 9, wherein the smart connection device further comprises a load voltage detection module electrically coupled to the load connection terminal and the controller, wherein the load voltage detection module is configured to detect a load voltage of the external load through the load connection terminal, and output a corresponding load voltage signal to the controller;

wherein the controller is configured to receive the load voltage signal, and determine a connection state and a voltage change state of the external load according to the load voltage signal; and the controller is further configured to output the drive signal when it is determined that the external load is forwardly coupled to the load connection terminal and the load voltage of the external load meets a preset condition.

13. The smart connection device of claim 9, wherein the smart connection device further comprises a current detection module electrically coupled between the power connection terminal and the load connection terminal, wherein the current detection module is further electrically coupled to the controller, and configured to collect a current in a current output loop in real time while the switch element is in an on state, and feed back a detected current sampling signal to the controller;

the controller is configured to determine, based on the received current sampling signal, whether a discharge output of the battery assembly is normal, and output the drive signal when it is determined that the discharge output of the battery assembly is normal.

14. A jump starter, comprising:
an energy storage module; and
a smart connection device comprising:
  a power connection terminal electrically coupled to the energy storage module;
  a load connection terminal configured to electrically couple with an external load;
  a switch element electrically coupled between the power connection terminal and the load connection terminal;
  a power supply loop of the switch element; and
  a reverse connection detection module electrically coupled to the load connection terminal and the power supply loop, respectively, wherein the reverse connection detection module is configured to output a first control signal to the power supply loop when it detects that the external load is reversely coupled to the load connection terminal;
wherein the power supply loop is in a disconnection state and supplies no power to the switch element when the power supply loop receives the first control signal; wherein the switch element is in an off state when the switch element receives no power supply, so as to make the power connection terminal and the load connection terminal be in a disconnection state, thereby preventing the energy storage module from providing a discharge output to the external load.

15. The jump starter of claim 14, wherein the smart connection device further comprises a reverse connection state indicating module electrically coupled to the reverse connection detection module, wherein the reverse connection detection module is further configured to output the first control signal to the reverse connection state indicating module, to control the reverse connection state indicating module to raise an alarm signal for indicating a reverse connection alarm prompt.

16. The jump starter of claim 14, wherein the smart connection device further comprises a drive power source module, wherein the drive power source module and the switch element are coupled in series in the power supply loop; the drive power source module is configured to receive power supply, and supply the power to the switch element;
the reverse connection detection module is further electrically coupled to the drive power source module, and outputs the first control signal to the drive power source module; and
the drive power source module disconnects the power supply loop and supplies no power to the switch element when the drive power source module receives the first control signal.

17. The jump starter of claim 16, wherein the jump starter further comprises a housing and a connection socket provided on the housing, wherein the connection socket is electrically coupled to the load connection terminal of the smart connection device, and configured to electrically couple with the external load through an external connection element; or
the jump starter further comprises a connection element, wherein one end of the connection element is electrically coupled to the load connection terminal of the smart connection device, and the other end of the connection element is configured to electrically couple with the external load.

18. A battery clamp, comprising:
a housing;
a power input interface provided on the housing, wherein the power input interface is configured to electrically couple with an external power supply device having an energy storage module;
a smart connection device comprising:
 a power connection terminal electrically coupled to the power input interface, and electrically coupled to the energy storage module of the external power supply device through the power input interface;
 a load connection terminal;
 a switch element electrically coupled between the power connection terminal and the load connection terminal;
 a power supply loop of the switch element; and
 a reverse connection detection module electrically coupled to the load connection terminal and the power supply loop, respectively; and
a connection element, wherein one end of the connection element is electrically coupled to the load connection terminal of the smart connection device, and the other end of the connection element is configured to electrically couple with an external load;
wherein the reverse connection detection module is configured to output a first control signal to the power supply loop when it detects that the external load is reversely coupled to the load connection terminal;
wherein the power supply loop is in a disconnection state and supplies no power to the switch element when the power supply loop receives the first control signal;
wherein the switch element is in an off state when the switch element receives no power supply, so as to make the power connection terminal and the load connection terminal be in a disconnection state, thereby preventing the energy storage module from providing a discharge output to the external load.

19. The battery clamp of claim 18, wherein the smart connection device further comprises a reverse connection state indicating module electrically coupled to the reverse connection detection module, wherein the reverse connection detection module is further configured to output the first control signal to the reverse connection state indicating module, to control the reverse connection state indicating module to raise an alarm signal for indicating a reverse connection alarm prompt.

20. The battery clamp of claim 18, wherein the smart connection device further comprises a drive power source module, wherein the drive power source module and the switch element are coupled in series in the power supply loop; the drive power source module is configured to receive power supply, and supply the power to the switch element;
 the reverse connection detection module is further electrically coupled to the drive power source module, and outputs the first control signal to the drive power source module; and
 the drive power source module disconnects the power supply loop and supplies no power to the switch element when the drive power source module receives the first control signal.

* * * * *